US005214831A

United States Patent [19]

Collins, Jr. et al.

[11] Patent Number: 5,214,831

[45] Date of Patent: Jun. 1, 1993

[54] HELICOIL EXTRACTION TOOL

[75] Inventors: Gerald J. Collins, Jr., Logan; Gary J. Swenson, Brigham City; J. Scott McClellan, Honeyville, all of Utah

[73] Assignee: Thiokol Corporation, Ogden, Utah

[21] Appl. No.: 892,400

[22] Filed: May 28, 1992

Related U.S. Application Data

[63] Continuation of Ser. No. 708,693, May 31, 1991, abandoned.

[51] Int. Cl.[5] ........ B23P 19/04

[52] U.S. Cl. ........ 29/240.5

[58] Field of Search ........ 29/240.5, 227; 81/440–445, 450

[56] References Cited

U.S. PATENT DOCUMENTS

| | | | |
|---|---|---|---|
| 2,586,805 | 2/1952 | Forster | 29/240.5 |
| 2,769,229 | 11/1956 | Forster | 29/240.5 |
| 3,019,517 | 2/1962 | Lovecky | 29/240.5 |
| 3,052,972 | 9/1962 | Steinmeyer | 29/240.5 |
| 4,553,303 | 11/1985 | Yamamota | 29/240.5 |

*Primary Examiner*—Robert C. Watson
*Attorney, Agent, or Firm*—Madson & Metcalf

[57] ABSTRACT

A tool for extracting a helicoil from a threaded hole is provided. The tool includes a wedge member which is configured such that it is capable of wedging one end of the helicoil away from the threads. The tool is also equipped with a pair of jaws which engage the end of the helicoil once it is wedged away from the threads. The tool is then twisted in such a direction that the helicoil tends to be contracted toward its longitudinal axis. Continued turning of the tool in this manner results in extraction of the helicoil from the threaded hole. The tool may also be equipped with a forward cylindrical member for positioning the tool within the interior of the helicoil prior to engagement of the helicoil.

21 Claims, 2 Drawing Sheets

HELICOIL EXTRACTION TOOL

This application is a continuation of U.S. application Ser. No. 07/708,693, filed May 31, 1991, now abandoned, for Helicoil Extraction Tool.

BACKGROUND

1. The Field of the Invention

The present invention is related to a tool for extracting helical coils ("helicoils") from threaded holes. More particularly, the present invention is related to a tool which is capable of wedging the end of the helicoil away from the thread and then securely capturing said end and twisting it out of a threaded hole in such a manner as to generally contract the helicoil inwardly toward its longitudinal axis.

2. Technical Background

Helicoils are a commonly used in the repair and refurbishing of mechanical mechanisms. In many situations it is common for threaded holes to be damaged such that the threads are no longer in their original usable condition. For example, it is common for a bolt placed within a threaded hole to become lodged. Removal of the bolt may require the application of forces sufficient to damage the threads within the threaded hole. Alternatively, simple wear and tear may eventually result in sufficient damage to the threads within a hole that they will no longer satisfactorily perform their intended functions.

Once a set of threads is damaged, however, there are a limited number of steps that can be taken in order to reuse or replace the mechanical part which includes a threaded hole. One alternative is clearly to discard the part. This alternative is only practical, however, when the part is relatively inexpensive and replacement parts are readily available. In the case of damaged threads included on large, complex, or expensive pieces of machinery, it may not be practical to simply replace the part. Rather, refurbishing of the part may be required.

One method of partially repairing the damaged threads involves drilling out the damaged threaded hole and then rethreading the new larger hole. It is obvious, however, that the new hole will no longer be capable of holding a bolt of the same size as the original hole. In order to solve this problem, it is conventional to insert a helicoil into the newly threaded hole.

A helicoil is, as the name would suggest, essentially a coiled helix. Such a device is shaped in the same general manner as a coiled spring. The coil is inserted into the newly threaded hole by first winding or compressing the coil in the same manner as a coil spring would be wound. Specialized tools are commercially available for winding the helicoil for insertion. The diameter of the coil is reduced during the winding step, providing for easy insertion of the coil into the threaded hole. When the insertion tool is removed, the coil unwinds and expands, seating the coil into the parent threads. Thus, the coil engages the parent threads through friction.

Once the helicoil is secured in place, it is possible to insert a bolt of the same size previously used in the device because the gap between the bolt and the threads is filled by the helicoil. Thus, it is not necessary to replace the device having the damaged threads, or to resort to a larger sized bolt. As was mentioned above, this mechanism is used in many different contexts, from small engines to very large and complex machinery.

One problem that has been frequently encountered in the use of a helical coil insert is difficulty in removal of the coil from the threaded hole after insertion. It is often necessary, over the life of a piece of machinery, to remove and replace the helicoil inserted within the threaded hole. Reasons for removal of the helicoil may include damage to the helicoil during use, or a need to fully refurbish the mechanical part in which the helicoil is seated.

It is conventional in the art to remove helicoils by using a standard wedge-shaped extraction tool. The extraction tool is wedged down into the interior of the threaded hole until it engages the helicoil. The wedge is generally provided with sharpened edges which are driven into the inside diameter of the first coil thread. Once the tool has engaged the coil the tool is twisted in the appropriate direction to back the helicoil out of the threads.

It will be appreciated that this type of tool has serious drawbacks in extracting the helicoil. The primary drawback relates to the direction of the forces exerted on the helicoil. In order for the wedge to securely engage the helicoil, a force is exerted outwardly from the radial axis of the helicoil. This outward force results in the application of additional pressure at the junction between the helicoil and the thread. Thus, an additional counteracting force is introduced during extraction which tends to damage the parent threads and to make extraction much more difficult.

Thus, it would be an advancement in the art to provide a tool for extraction of helicoils which overcomes the drawbacks of existing extraction tools. More particularly, it would be an advancement in the art to provide a helicoil extraction tool which was capable of extracting helicoils without the necessity of wedging the tool into the interior of the helicoil thus minimizing damage to the parent threads and additional forces opposing extraction. It would be an advancement in the art to provide such a removal device which was capable of drawing the helicoil away from the parent thread. It would be a related advancement in the art to provide such a device which tended to generally reduce the diameter of the helicoil during extraction.

Such an apparatus is disclosed and claimed herein.

BRIEF SUMMARY AND OBJECTS OF THE INVENTION

As was mentioned above, the present invention is related to a tool for extracting helical coils from threaded holes. Unlike existing devices for extracting helicoils, the present invention provides a tool which is capable of securely capturing the end of a helicoil, and twisting it out of a threaded hole in such a manner as to generally contract the helicoil inwardly toward its longitudinal axis.

The tool of the present invention is comprised of a series of functional elements combined into an integral structure. Importantly, the extraction tool includes means for forcibly wedging the forward end of the helicoil away from the threads within the threaded hole. In one embodiment of the device this wedging means comprises a pointed structure which has the radius of the inside diameter of the parent thread. Thus, the wedging structure travels through the thread until it encounters the helicoil. At that point, the wedging structure lifts the end of the helicoil away from the parent thread.

Once the end of the helicoil is lifted away from the parent thread it encounters means for capturing and securing the end of the helicoil. In one embodiment of the device, this means comprises a pair of jaws disposed within the device. The end of the helicoil enters the jaws. However, when the direction of rotation of the device is reversed, the jaws securely capture and engage the helicoil. Thus, the tool can be backed out of the threaded hole while the end of the helicoil is secured within the tool.

In one embodiment, the jaws include a stationary outer jaw and a rotatable inner jaw. Thus, when the end of the helicoil is inserted into the jaws, any attempt to withdraw the helicoil causes the rotatable jaw to turn in such a manner as to more securely engage the end of the helicoil. During removal the end of the helicoil is securely held in place by the jaws.

The device is also provided with a body portion and an attached handle. The handle is configured in such a manner that the device can be easily rotated by hand. Alternatively, the handle can easily be attached to a mechanical device, manual or motorized, for turning the device. The body includes means for attaching the handle at its upper portion. The body a illustrated herein tapes outwardly toward its base in a generally frustoconical manner. The base of the body is configured such that the remainder of the device can be easily attached, and such that it is small enough in diameter to be easily positioned for extraction of a helicoil.

The apparatus may also include means for positioning the device within the interior of the helicoil. In one embodiment, that means takes the form of a cylindrical section positioned on the forward end of the apparatus. The cylindrical section is slightly smaller in diameter than the inside diameter of the helicoil. Accordingly, the cylindrical section slides into the helicoil and aids in placing the device in position to engage the end of the helicoil.

Thus, the present invention provides a tool for extracting a helicoil from a threaded hole. The tool includes means for capturing and securing the end of the helicoil in the form of the jaws described above. The tool also provide a mechanism for forcibly wedging the end of the helicoil inwardly away from the threads and into the interior of the device. Thus, when the device is backed out of the threaded hole, a force is applied to the helicoil which causes it to tend to contract along its longitudinal axis, which enables continued rotation of the tool and the attached helicoil in such a manner as to twist the helicoil out of the threads.

It is therefore, a primary object of the present invention to provide a tool for extraction of helicoils which overcomes the drawbacks of existing extraction tools.

More particularly, it is an object of the present invention to provide a helicoil extraction tool which is capable of extracting helicoils without the necessity of wedging the tool into the interior of the helicoil, thus eliminating damage to the parent threads and additional forces opposing extraction.

It is also an object of the present invention to provide a helicoil removal device which is capable of drawing the helicoil away from the parent thread.

It is a related object of the invention to provide such a device which tends to generally reduce the diameter of the helicoil during extraction.

Other advantages and objects of the invention will become apparent upon reading the following detailed description and appended claims, and upon reference to the accompanying drawings.

DETAILED DESCRIPTION OF THE PREFERRED EMBODIMENTS

Figure 1:
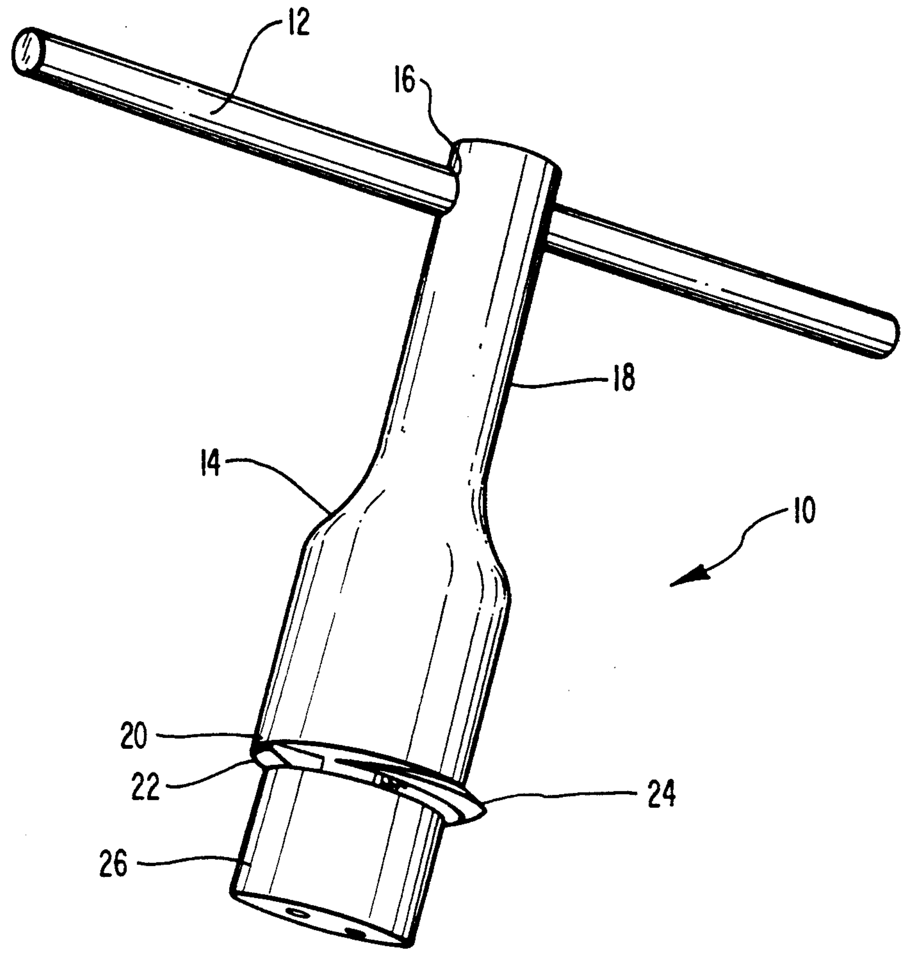
FIG. 1 is a side perspective view of one embodiment of the tool of the present invention.

The present invention is best understood by reference to the attached drawings where like parts are designated with like numerals throughout. FIG. 1 is a side perspective view of one embodiment of the apparatus of the present invention and is generally designated 10. As mentioned above, the apparatus of the present invention comprises a tool which is particularly useful for removal of helicoils from the interior of threaded holes.

The apparatus 10, as illustrated in FIG. 1, is comprised of three primary sections. The upper section of the tool is comprised of a handle 12 and a body 14. The handle 14 is attached to the body by any conventional method employed in the making of machine tools. In the embodiment illustrated in FIG. 1, the handle 12 is simply inserted through an opening 16 disposed through the upper portion of the body 14. As illustrated the handle is comprised of a metal rod which can slide as desired within the opening 16. The handle may also be attached in any other desired manner.

It will be appreciated, that the handle 12 illustrated in FIG. 1 is constructed for manual use. However, the handle and the body may be constructed such that the apparatus 10 can be attached to a mechanical device for providing a rotational force. Such mechanical device could be manually operated, or could potentially be motorized.

The body 14 is constructed of metal material similar to that used to construct the handle. One such metal would be steel of acceptable grade. The body 14 includes means for attaching the handle 12 as part of its upper portion 18, as has already been discussed. As illustrated in FIG. 1 the body 14 generally tapers outwardly toward its base 20 in a generally frustoconical manner. The base of the body 14 is of such a diameter so that the remainder of the device is easily and securely attached to the base 20. However, the base 20 has a small enough diameter that it is easily positioned for extraction of the helicoil.

The apparatus 10 also includes an intermediate section 22. Intermediate section 22 has an outside diameter and outside wall configuration 24 such that it is capable of traveling through the threads of interest. Essentially, the tool 10 is twisted through the threads, being guided by the outside wall 24 of the intermediate section 22. As will be discussed in further detail below, the intermediate section 22 also contains the structural features necessary to forcibly wedge the end of the helicoil away from the threads within the threaded hole, as well as means for capturing and securing the end of the helicoil.

Also illustrated in FIG. 1 is a forward section 26 which is specifically configured such that the tool 10 can be easily positioned within the interior of the threaded hole. The forward section 26 is generally cylindrical in shape. The forward section 26 is sized such that it can easily slip within the inside diameter of the helicoil a it lays within the threaded hole.

Figure 2:
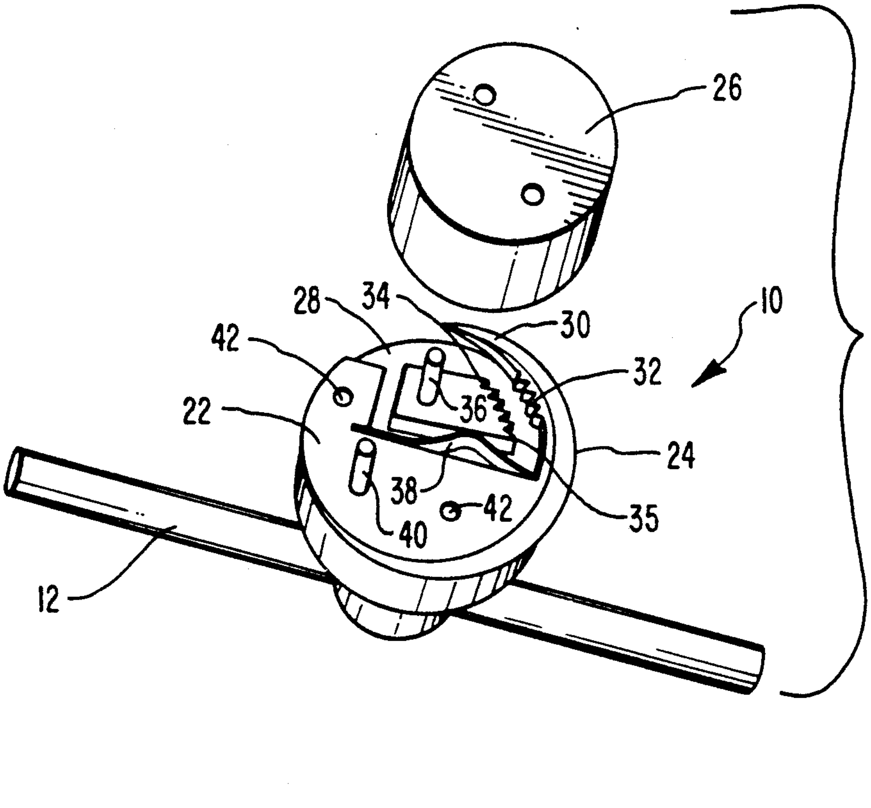
FIG. 2 is a plan view of the intermediate section of the tool including means for wedging the helicoil away from the threads and jaws for capturing and securing the end of the helicoil.

Some of the important operable features of the tool 10 can be more fully appreciated with reference to FIG. 2. FIG. 2 is a plan view of the intermediate section 22. As can be seen from FIG. 2, the outside wall 24 has the same cross section and outside diameter as a thread which can be twisted into the threaded hole containing the helicoil. The outside wall 24, however, is provided with a gap 28. This gap 28 results in the formation of a curved wedging member 30.

As can be seen in FIG. 2, the curved wedging member 30 is configured such that if it encounters an object within the threads, that object is forcibly wedged out of seating engagement with the thread. In the context of the present invention, the curved wedging member 30 will encounter the end of the helicoil as the tool is twisted into a threaded hole. As the tool 10 continues to be twisted along the threads, the end of the helicoil will be forcibly wedged out of the threads.

The intermediate section is also provided with a pair of jaws. The jaws include an outer stationary jaw 32 and an inner rotatable jaw 34, however, other jaw configurations will also fall within the scope of the present invention. The stationary jaw 32 is provided with a plurality of teeth, as is the rotatable jaw 34. The rotatable jaw 34 is allowed to rotate about a pivot pin 36 and is further configured such that the teeth of the jaw move closer to the stationary jaw 32 when the jaw 34 is rotated in a counterclockwise direction in the illustrated embodiment. That is, the rotatable jaw 34 is not symmetrical, but rather includes an extension 35 which protrudes toward the stationary jaw 32.

FIG. 2 also illustrates a small leaf spring 38 which prevents the rotatable jaw 34 from moving too far into the intermediate section during insertion of the device in a threaded hole. The spring also assures that the rotatable jaw 34 will adequately engage the end of a helicoil during the inserting procedure. This operation will be discussed in additional detail below. Finally, the intermediate section may be provided with pins 40 and holes 42 for use in assembling the tool. The illustrated pins extend into the forward section 26 and hold it in place, as well as acting as a pivot pin 36. The holes 42 may be used to receive screws used for attachment of the several sections of the tool 10.

Figure 3:
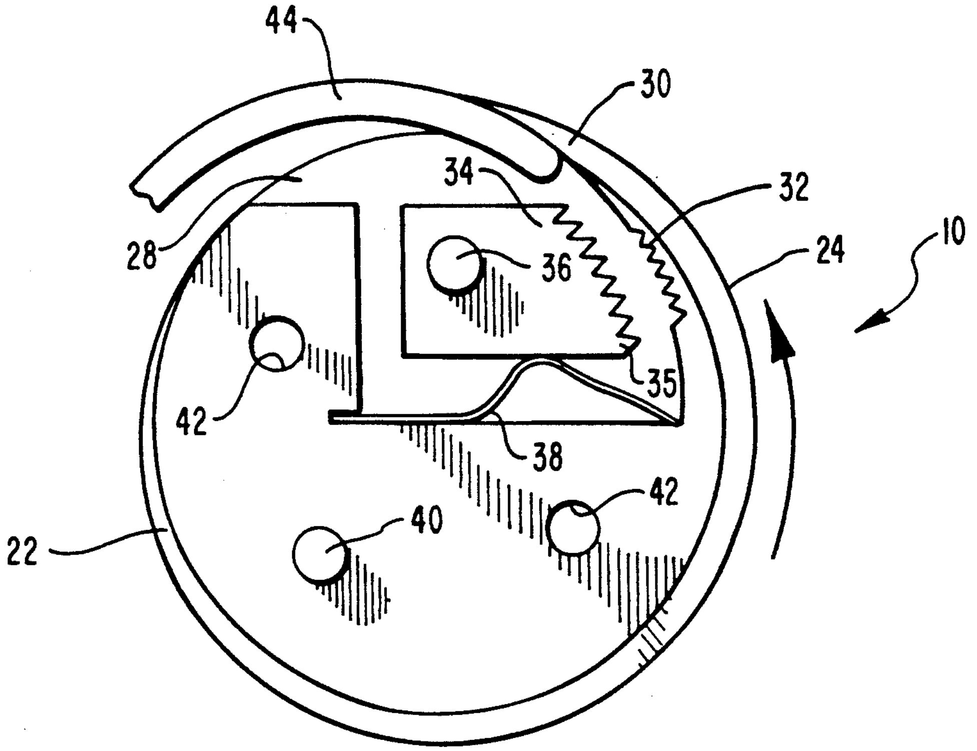
FIG. 3 is a bottom plan view of the intermediate section of the tool illustrating the manner in which the end of the helicoil enters the tool.
Figure 4:
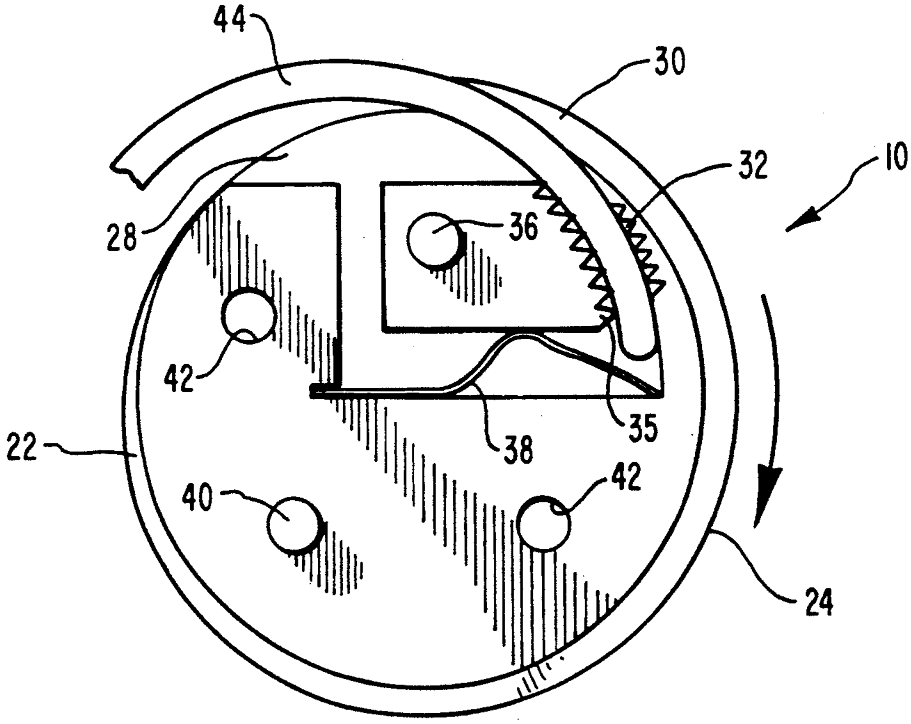
FIG. 4 is a plan bottom view of the intermediate section of the tool illustrating the manner in which the end of the helicoil is captured and secured by the jaws.

The operation of the device can be more fully appreciated with reference to FIGS. 3 and 4. FIG. 3 illustrates the insertion of the end of the helicoil 44. As mentioned above, the curved wedging member 30 will encounter the end of the helicoil in the thread. Since the outside wall 24 of the intermediate section is configured such that it can be threaded into the threads, however, the wedging member 30 will force the end of the helicoil away from the wall of the threaded hole and into the tool 10. The tool 10 continues to be twisted into the threads until the helicoil is fully engaged by the tool 10.

At that point the relationship of the helicoil 44 and the tool 10 is that shown in FIG. 4. As was mentioned above, and as illustrated in FIG. 4, the jaws 32 and 34 are configured such that when the end of the helicoil 44 is lifted off the thread by the curved wedging member 30, it enters the jaws. When the tool 10 is then turned in a reverse direction for removal from the threaded hole, the rotatable jaw 34 is in a counterclockwise direction in the illustrated embodiment. This rotation causes the rotatable jaw to rotate such that it engages the helicoil 44, and in turn forces the helicoil 44 against the stationary jaw 32. When this occurs, the rotatable jaw 34 is forced to further lock the helicoil 44 in place.

As the handle 12 and the body 14 are rotated in a clockwise direction, in the illustrated embodiment, the helicoil is generally caused to contract along its longitudinal axis in the same manner as the winding of a spring. That is, the forces applied tend to reduce the diameter of the helicoil as it is removed. Thus, there is no additional force pushing the helicoil into the threads as is conventional. Rather, the forces applied pull the helicoil inwardly away from the threads. Therefore, it is a simple matter to continue rotation of the tool 10 until the helicoil is fully extracted from the threads.

It will be appreciated that the intermediate section can easily be interchanged with similarly constructed sections of different size. Accordingly, a single tool can be used to extract helicoils from threaded holes over a range of sizes. In addition, the orientation of the operative elements can also be reversed to operate in environments using left hand threads. Thus, the tool 10 of the present invention is flexible to use, relatively inexpensive and simple to manufacture, and meets all of the objectives outlined above.

In summary, the present invention provides a tool for extraction of helicoils which overcomes the drawbacks of existing extraction tools. Specifically, the helicoil extraction tool is capable of extracting helicoils without the necessity of wedging the tool into the interior of the helicoil. This capability eliminates damage to the parent threads, as well as the additional forces conventionally opposed extraction. In essence the tool is capable of drawing the helicoil away from the parent thread. Thus, use of the tool for extraction of the helicoil tends to generally reduce the diameter of the helicoil during extraction.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for the extraction of a helicoil from a threaded hole comprising:

means for forcibly wedging an end of the helicoil away from the threads within the hole, said means comprising a curved wedging member configured such that it engages the end of the helicoil if the apparatus is rotated in a direction opposite to the direction of coil of the helicoil, said curved wedging member further configured such that it is capable of threading engagement with the threads of the threaded hole;

means for capturing and securing the end of the helicoil; and means for providing a rotational force to the apparatus while the end of the helicoil is so captured, such that the helicoil tends to contract toward its longitudinal axis, enabling continued rotation of the apparatus to extract the helicoil from the threaded hole.

2. An apparatus for the extraction of a helicoil from a threaded hole as defined in claim wherein said means for capturing and securing the end of the helicoil comprises at least one stationary jaw configured such that it is capable of contacting the end of the helicoil.

3. An apparatus for the extraction of a helicoil from a threaded hole as defined in claim 2 wherein said means for capturing and securing the end of the helicoil comprises at least one movable jaw which is configured such that it is capable of cooperating with said stationary jaw in order to capture and secure the end of the helicoil.

4. An apparatus for the extraction of a helicoil from a threaded hole as defined in claim 3 wherein said means for capturing and securing the end of the helicoil further comprises spring biasing means for biasing the movable jaw toward the stationary jaw.

5. An apparatus for the extraction of a helicoil from a threaded hole as defined in claim 1 wherein said means for providing rotational force comprises a body and a handle.

6. An apparatus for the extraction of a helicoil from a threaded hole as defined in clam 5 wherein said body and handle are configured such that they are capable of being rotated manually.

7. An apparatus for the extraction of a helicoil from a threaded hole as defined in claim 5 wherein said body and handle are configured such that they are capable of being rotated mechanically.

8. An apparatus for the extraction of a helicoil from a threaded hole as defined in claim 1 further comprising means for positioning the apparatus within the interior of the helicoil.

9. An apparatus for the extraction of a helicoil from a threaded hole as defined in claim 10 wherein said positioning means comprises a cylindrical section attached to the apparatus in such a manner that the cylindrical member can be placed within the interior of the helicoil prior to attachment of the device to the end of the helicoil.

10. An apparatus for the extraction of a helicoil from a threaded hole comprising:

- means for forcibly wedging the end of the helicoil away from the threads within the hole, said wedging means comprising a curved wedging member configured such that it engages the end of the helicoil if the apparatus is rotated in a direction opposite to the direction of coil of the helicoil, said wedging member configured such that it is capable of threading engagement with the threads of the threaded hole;
- at least one jaw for capturing and securing an end of the helicoil; and
- a handle for providing a rotational force to the apparatus while the end of the helicoil is so captured, such that the helicoil is caused to generally contract toward its longitudinal axis, enabling continued rotation of the apparatus to extract the helicoil from the threaded hole.

11. An apparatus for the extraction of a helicoil from a threaded hole as defined in claim 10 wherein said at least one jaw comprises a stationary jaw and a movable jaw configured such that they are capable of capturing and securing the end of the helicoil.

12. An apparatus for the extraction of a helicoil from a threaded hole as defined in claim 10 further comprising a body attached to said handle.

13. An apparatus for the extraction of a helicoil from a threaded hole as defined in claim 12 wherein said body and handle member are configured such that they are capable of being rotated manually.

14. An apparatus for the extraction of a helicoil from a threaded hole as defined in claim 12 wherein said body and handle member are configured such that they are capable of being rotated mechanically.

15. An apparatus for the extraction of a helicoil from a threaded hole as defined in claim 10 further comprising a cylindrical section attached to the apparatus in such a manner that the cylindrical section can be placed within the interior of the helicoil prior to attachment of the device to the end of the helicoil.

16. An apparatus for the extraction of a helicoil from a threaded hole comprising:

- means for forcibly wedging the end of the helicoil away from the threads within the hole comprising a curved wedging member configured such that it is capable of threading engagement with the threads of the threaded hole;
- a stationary jaw and a rotatable jaw positioned such that they are capable of cooperating in capturing and securing an end of the helicoil; and
- a body and attached handle capable of being turned in such a manner as to provide rotational force to the apparatus while the end of the helicoil is captured, such that the helicoil is caused to generally contract toward its longitudinal axis, enabling continued rotation of the apparatus to extract the helicoil from the threaded hole.

17. An apparatus for the extraction of a helicoil from a threaded hole, comprising:

- a stationary curved wedging member for forcibly wedging an end of the helicoil away from the threads within the hole;
- means for capturing and securing the end of the helicoil; and
- means for providing a rotational force to the apparatus while the end of the helicoil is so captured, such that the helicoil tends to contract toward its longitudinal axis, enabling continued rotation of the apparatus to extract the helicoil from the threaded hole.

18. An apparatus for the extraction of a helicoil from a threaded hole as defined in claim 17, wherein said wedging member is configured such that it engages the end of the helicoil if the apparatus is rotated in a direction opposite to the direction of coil of the helicoil.

19. An apparatus for the extraction of a helicoil from a threaded hole as defined in claim 17, wherein said stationary curved wedging member includes a stationary jaw.

20. An apparatus for the extraction of a helicoil from a threaded hole as defined in claim 19, further comprising a rotatable jaw capable of cooperating with said stationary jaw in capturing and securing the end of the helicoil.

21. An apparatus for the extraction of a helicoil from a threaded hole as defined in claim 20, further comprising spring biasing means for biasing the rotatable jaw toward the stationary jaw.

* * * * *

UNITED STATES PATENT AND TRADEMARK OFFICE
CERTIFICATE OF CORRECTION

PATENT NO. : 5,214,831

DATED : June 1, 1993

INVENTOR(S) : Gerald J. Collins, Jr.; Gary J. Swenson, J. Scott McClellan

It is certified that error appears in the above-identified patent and that said Letters Patent is hereby corrected as shown below:

Column 1, line 7, insert the following information:

The invention described herein was made in the performance of work under a NASA Contract and is subject to the provisions of Section 305 of the National Aeronautics and Space Act of 1958, Public Law 85-568 (72 Stat. 435, 42 U.S.C. 2457).

Signed and Sealed this

Twenty-third Day of August, 1994

Attest:

Bruce Lehman

BRUCE LEHMAN

*Attesting Officer*

*Commissioner of Patents and Trademarks*